Figure 3:
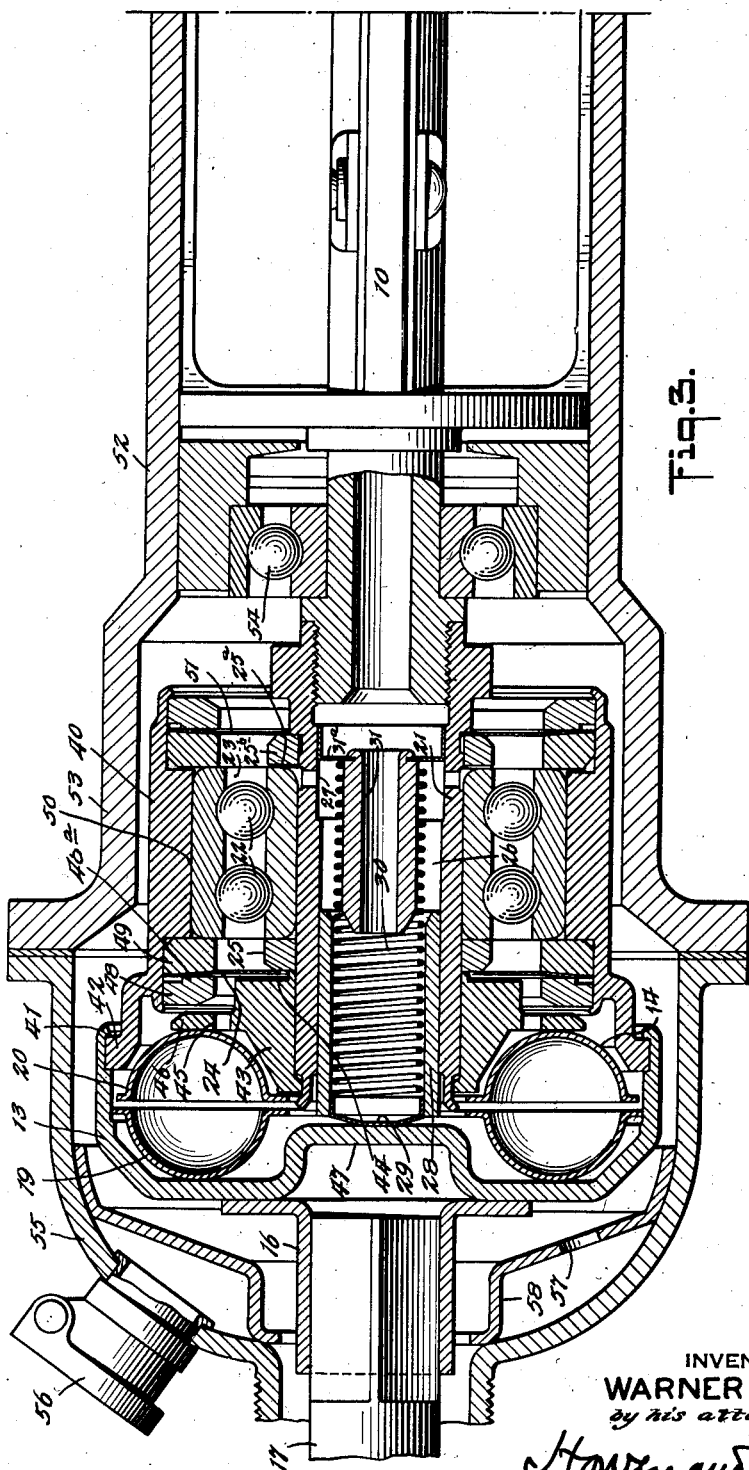

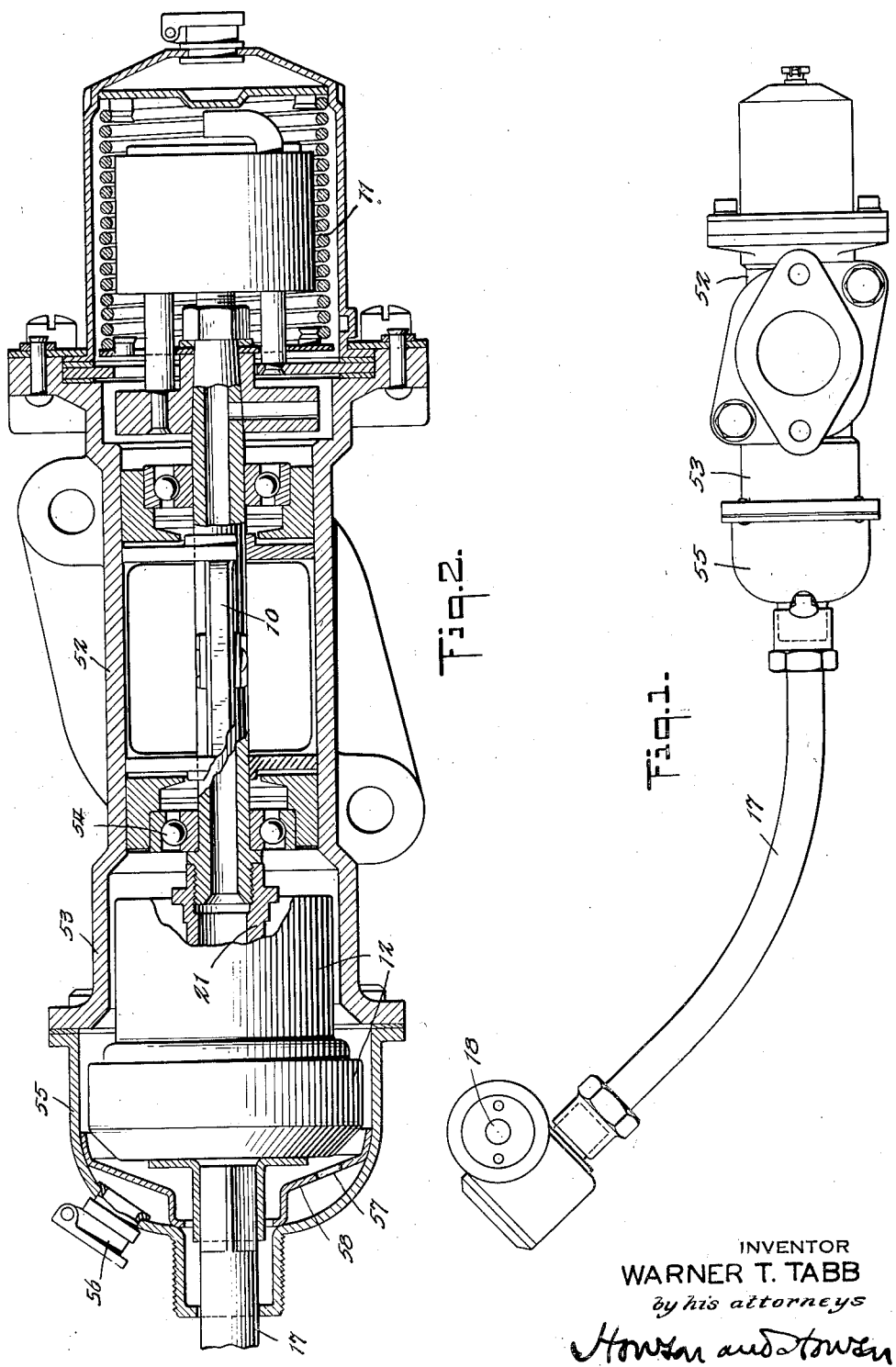

Aug. 11, 1931.  W. T. TABB  1,818,825
HYDRAULIC TRANSMISSION
Filed July 27, 1929    2 Sheets-Sheet 2

INVENTOR
WARNER T. TABB
by his attorneys

Patented Aug. 11, 1931

1,818,825

UNITED STATES PATENT OFFICE

WARNER T. TABB, OF MAHWAH, NEW JERSEY, ASSIGNOR TO EISEMANN MAGNETO CORPORATION, OF NEW YORK, N. Y., A CORPORATION OF NEW YORK

HYDRAULIC TRANSMISSION

Application filed July 27, 1929. Serial No. 381,630.

My invention relates to hydraulic transmission of the type wherein some outside element rotates a driving member or pump which influences through an operating fluid a second member called the driven element, turbine or motor. The invention is especially useful when applied to a regulator or governing mechanism in which the driven member actuates a valve but its use is not confined to such a mechanism. Certain features of it may be applied to hydraulic devices, either pumps or turbines, when not used in a transmission device.

One object of the invention is to provide a transmission of the class described which will operate satisfactorily in any desired position. Another object is to prevent mixing of the operating fluid and the lubricant used. A further object is to provide a compact device requiring only a small quantity of operating fluid and having provision for expansion of the said fluid. Other objects will appear upon consideration of this specification.

A preferred form of the invention is illustrated in the accompanying drawings, in which—

Figure 1 is an elevation of a governing unit having the pump element of the transmission connected to a rotating engine part, Figure 2 is an elevation, partly in section, showing the governing unit, and Figure 3 is a longitudinal mid-section of the governor showing the parts forming the transmission and the valve.

In the drawings, the governor comprises a valve 10, a spring rigging 11 which tends to keep the valve open, and a hydraulic transmission 12 tending to close the valve against the effort of the spring when driven at the proper speeds. With the specific valve and spring rigging construction the present invention is not concerned, the preferred forms of them being described in my application Serial No. 381,629 filed on even date herewith.

The transmission 12 comprises an impeller or pump element 13 and a motor. The impeller is adapted to transmit a torque to the motor by means of an operating fluid which it actuates and which is in contact with both the impeller and the motor so as to drive the latter.

The impeller has secured to it an angular sleeve 16 rotated by a flexible shaft 17 geared at 18 to a part which moves in correspondence with the speed of the engine to be governed. It will thus be obvious that the speed with which the impeller 13 rotates will vary with and will be a direct function of the engine speed.

The impeller is provided with buckets 19, and likewise the turbine or impelled member is provided with oppositely positioned buckets 20, the particular form of which is not a part of this invention. The form shown in my Patent 1,572,972 is a satisfactory one but not the only one possible. The motor 14 is mounted upon a hollow shaft 21 which is threaded to another hollow shaft forming the valve stem. It is found convenient to use this other shaft also as the spindle of the spring rigging 11 so that the motor and the spring rigging may be rigidly connected to the valve stem on opposite sides of the valve 10. This arrangement may be varied as desired.

In order to reduce friction and in order that the motor may turn as freely as possible except for the influence of the spring rigging, there are provided ball bearings 22 in an annular lubricating chamber 23 containing oil or grease. With such an arrangement (practically eliminating, as it does, the effect of friction) the characteristics of the resistance to turning of the motor may be controlled almost entirely by the characteristics of the particular form of spring rigging which is selected. The inner race of the ball bearing unit is mounted on the motor shaft 21 while the outer race is received within an annular shell 40 which turns with the impeller element 13, being held thereto by the crimped-over end 41 of the impeller shell which rests over the flange 42 on the bearing shell 40. The main part or hub 43 of the motor, carrying the buckets 20, is mounted on the shaft 21 to turn therewith and is spaced from the inner bearing race by a ring member 25. The face of this hub adjacent the ring member 25 is cut back to form the annular groove 44 between it and the said ring member. A series of apertures 45 are formed in the radial flange 46 of the hub 43.

The mid area of the impeller shell 13 is formed as an inwardly extending boss 47 which decreases the free space around the buckets and thus makes it possible to use a small quantity of operating fluid and still to have this fluid practically filling the free space in the transmission unit.

It is highly desirable, of course, that the transmission be constructed to operate in any position whatever. To that end means are provided for separating the operating fluid from the lubricant to prevent their mixing, this means being preferably an annular disc of resilient sheet metal packing 24 between the annular lubricating chamber 23 and the operating fluid, this disc being held at its outer portion between two ring members 48, 49 which are secured in any suitable manner in the bearing shell 40 against the shoulder provided by the midpart 50 which receives the outer ball race. The face of the ring member 49 toward the member 48 is beveled and thus the disc 24 is given a dish shape by reason of the engagement therewith of the annular bead or boss 48$^a$ on the engaging face of the ring member 48. As a result, the disc conforms to the bevel. Its inner rim which lies in the groove 44, described above, resiliently engages the side face of the ring member 25. As the impeller turns, this running engagement on a line contact is maintained and affords an effective seal between the transmission chamber and the bearing chamber.

In case of excessive pressure in the bearing chamber, an unusual but not impossible condition, the disc 24 can yield and open a relief passage to the transmission chamber. At the other end of the bearing chamber there is a similarly constructed disc seal 51, yieldable outwardly, which under all normal conditions prevents flow of lubricant from the bearing chamber to the space surrounding the transmission. Relief past these discs occurs only if the normal inflow and outflow passages are clogged or are insufficient to effect relief.

The valve stem and shaft 21 are hollow so that the motor may be lubricated therethrough. To this end the housing containing the spring rigging is filled with the lubricant—oil or grease—which then flows through the hollow valve stem into the hollow interior bore of the motor to supplement or to replenish the lubricant which initially is placed in the lubricating chamber 23 as mentioned above. From this hollow interior bore 26 the lubricant flows through passages 27 and through the radial grooves 25$^a$ in the side face of the ring 25$^b$ into the annular lubricating chamber 23.

Experiments indicate that the best operating fluid is mercury. However, mercury, and for that matter most practicable operating fluids, have a co-efficient of expansion such that it is necessary to make provision for their expansion when they are confined as they are here. A piston is provided comprising an annular ring 28 fitting the wall of the bore 26 in the shaft 21 and a dished plate 29 closing its end, this piston being slidable longitudinally within the said bore. A spring 30 is coiled longitudinally of the bore 26, and tends to keep the piston at the impeller end thereof. A second annular ring 31 is spaced from the wall of the motor bore 26 by a disc 31$^a$ having a flange tightly fitting the said wall and is disposed immediately within the spring 30 adjacent the end remote from the impeller.

The ring 31 acts as a guide for the spring 30 and prevents it from buckling while the disc 31$^a$ serves to close the bore against flow except through the ring 31. Since, whatever the position of the unit, all of the lubricant within the bore 26 cannot escape through the ring 31, the motor chamber can not be emptied inadvertently and thus a quantity of lubricant is kept therein under all conditions. The flow of lubricant to the motor chamber is however not prevented.

When the operating fluid expands, the piston moves away from the impeller member against the resistance of the spring 30. When the mercury contracts, the spring pushes the piston toward the impeller. The position of the piston shown is that which it occupies if no operating fluid is in the unit or if the fluid is very cold. The fact that the entire spring rigging chamber, hollow valve stem, hollow motor bore, and annular lubricating chamber are not hermetically sealed, permits the piston to move as described. It should be further noted that mercury has a capillary action opposite from that of oil and therefore does not tend to extend between two surfaces such as the wall of the bore 26 and the outside of the ring 28 which are in sliding contact. On the other hand, the lubricant does extend between these surfaces and lubricates them, acting also as a seal.

The impeller and motor may be supported on bearings without an outer casing but preferably such a casing is provided as shown here. The valve casing 52 has a bell end 53 and contains the bearing 54 which supports the transmission end of the common shaft for the spring valve and motor. A cover 55 fits the bell end 53 of the valve casing and surrounds the impeller and motor proper, leaving a clearance for a cooling fluid around the same and providing an opening for the impeller shaft 17. The cooling fluid, preferably an oil, is fed from the cup 56 to the outer casing and over flows through an opening 57 in the shield 58 which is secured to the cover 55. This fluid then is moved, by splash principally, around the transmission and to the bearing 54.

From the foregoing explanation the operation of the transmission will be evident. Rotary movement is transmitted from a moving part of the engine at 18 to the flexible shaft 17 which is connected to the angular sleeve 16 of the impeller 13. The impeller is thereby rotated in correspondence with the speed of the engine. The buckets of the impeller throw the operating fluid against the buckets of the motor, tending to rotate the latter with the former, and thus to close the valve 10. This action is opposed substantially by the spring rigging alone, friction being reduced to a minimum by the means which has been described.

Since the lubricant for the bearings is contained in the space around the bearings and in the hollow shaft as well, the two spaces being in communication, a "breathing" action takes place as the lubricant varies in temperature. On expansion some of the lubricant from the bearing chamber moves into the hollow shaft but it can not be emptied therefrom because of the arrangement of the sealing disc 31$^a$ and the annulus 31 described above. Upon cooling, it is returned to the bearing chamber partly by gravity and partly by suction if the level of lubricant is such that the annulus 31 is full of lubricant. Lubricant therefore is always kept around the bearings.

It will be understood that if the transmission is not used with a governor valve as shown here, any source of lubricant, delivering to the hollow shaft or, if desired, to the bearing chamber, may be used. In case the level of lubricant in the hollow shaft is sufficiently high, surplus of lubricant may discharge back through the annulus 31 when expansion of lubricant in the motor occurs. Under suitable conditions, lubricant will be drawn into the motor bearing and the hollow shaft 21 through the annulus 31 when contraction of the lubricant in the motor occurs.

When the load on the engine is decreased or removed the engine speed increases. The speed of the impeller will increase correspondingly because of the direct connection, thus throwing the operating fluid more violently against the motor and exerting a greater torque upon it. The engine speed increases until the motor torque overcomes the effort of the spring and moves the valve toward the closed position against the spring action. When the load on the engine is increased its speed falls, and with it the speed of the impeller and the torque of the motor. The valve is then opened by the spring. The valve in the instance given controls the supply of motive fluid (gas or steam) to the engine.

As has been set forth above, the invention is not limited to use in connection with engine governors. With the understanding therefore that other applications of the invention will be known to or found by those skilled in the art, I wish to include within the scope of the protection afforded by a patent all constructions embodying any of the novel subject matter here described or variations thereof coming within the fair range of the following claims.

I claim:—

1. A speed regulator comprising a valve, means acting to keep the valve open, a cover surrounding said valve and said means, a speed-responsive transmission for closing the valve at predetermined speeds, said transmission comprising a pump impeller, a turbine impeller, an operating fluid between said impellers, and a housing turning with said pump impeller and surrounding said transmission, in combination with a hollow shaft connecting said valve, said means, and said turbine impeller, with which all are adapted to turn, a bearing between said shaft and said housing, said hollow shaft being adapted to permit passage of lubricant therethrough from said cover to said bearing.

2. A speed regulator comprising a valve, means acting to keep the valve open, a cover surrounding said valve and said means, a speed-responsive transmission for closing the valve at predetermined speeds, said transmission comprising a pump impeller, a turbine impeller, an operating fluid between said impellers, and a housing turning with said pump impeller and surrounding said transmission, in combination with a hollow shaft connecting said valve, said means, and said turbine impeller, with which all are adapted to turn, a bearing between said shaft and said housing, said hollow shaft being adapted to permit passage of lubricant therethrough from said cover to said bearing, and means for keeping said operating fluid separate from the lubricant.

3. A speed regulator comprising a valve, means acting to keep the valve open, a cover surrounding said valve and said means, a speed-responsive transmission for closing the valve at predetermined speeds, said transmission comprising a pump impeller, a turbine impeller, an operating fluid between said impellers, and a housing turning with said pump impeller and surrounding said transmission, in combination with a hollow shaft connecting said valve, said means, and said turbine impeller, with which all are adapted to turn, a bearing between said shaft and said housing, said hollow shaft being adapted to permit passage of lubricant therethrough from said cover to said bearing, means for keeping said operating fluid separate from the lubricant and a piston for permitting expansion of the operating fluid within said transmission.

4. A speed regulator comprising a valve, means acting to keep the valve open, a cover surrounding said valve and said means, a speed-responsive transmission for closing the valve at predetermined speeds, said transmission comprising a pump impeller, a turbine impeller, a body of mercury between said impellers, and a housing turning with said pump impeller and surrounding said transmission, in combination with a hollow shaft connecting said valve, said means, and said turbine impeller, with which all are adapted to turn, a bearing between said shaft and said housing, said hollow shaft being adapted to permit passage of lubricant therethrough from said cover to said bearing, means for keeping said mercury separate from the lubricant and a piston for permitting expansion of the mercury within said transmission, substantially as described.

5. In combination, a casing, a valve and valve spindle mounted to turn therein, a speed responsive transmission in said casing comprising two bucket rotors face to face, a housing carrying one rotor and extending over the other, a bearing for said housing and means projecting inwardly from said housing for sealing an operating fluid within said housing separate from the bearing, one of said rotors being driven and the other being connected to the valve spindle.

6. In combination, a casing, a valve and valve spindle mounted to turn therein, a speed responsive transmission in said casing comprising a turbine element secured to said valve spindle at one end, a bearing on said spindle, a housing mounted on said bearing and having a closed end with a pump element arranged to drive said turbine element through a body of fluid in said housing, sealing means between said housing and spindle on both sides of said bearing and means for supplying lubricant through said spindle to said bearing.

7. In combination, a hollow spindle, a bucket rotor secured on one end thereof, a bearing on the spindle and a housing over said rotor and mounted on said bearing, said housing having a closed end and a bucket rotor adjacent the rotor on the spindle whereby one may drive the other through a body of fluid contained in said housing, and a piston in the end of said hollow spindle to permit expansion of said operating fluid.

8. In combination, a spindle, a bucket rotor secured to the spindle, a bearing on the spindle, a housing mounted on said bearing and having a bucket rotor in operative relation to the bucket rotor on the spindle whereby one may drive the other through a body of fluid contained in the housing between them, sealing means between the housing and the spindle on both sides of the bearing and provision for supplying lubricant to the bearing through the spindle.

9. In combination, a spindle, a turbine mounted to turn said spindle, a pump mounted to turn freely on said spindle, the turbine and pump having series of open buckets facing toward each other whereby a contained body of operating fluid transmits torque from the pump to the turbine, together with means for lubricating the bearing between the spindle and the pump and a seal to maintain the operating fluid and the lubricant separate, said seal yielding under lubricant pressure.

10. In combination, a spindle, a series of open buckets secured to said spindle at one end, a bearing on said spindle and a housing mounted to turn on said bearing, said housing having a closed end and a series of open buckets secured thereto facing the said buckets on the spindle, said housing having an inwardly projecting yieldable disk forming a chamber in said housing to retain an operating fluid.

11. In combination, a spindle, a series of open buckets secured to said spindle at one end, a bearing on said spindle and a housing mounted to turn on said bearing, said housing having a closed end and a series of open buckets secured thereto facing the said buckets on the spindle, means providing a sealed running joint between said housing and the spindle to maintain an operating fluid in the housing and means providing an expansion chamber for said operating fluid in said spindle.

12. In combination, a spindle, a series of open buckets secured to said spindle at one end, a bearing on said spindle and a housing mounted to turn on said bearing, said housing having a closed end and a series of open buckets secured thereto facing the said buckets on the spindle, a sealing ring between said buckets and the bearing affording a sealed running joint between the spindle and said housing and means providing an expansion chamber for said operating fluid in said spindle.

13. In combination, a spindle, a series of open buckets secured to said spindle, a housing having a bearing on said spindle, said housing having a series of open buckets facing the open buckets on said spindle and containing an operating fluid and an expansion chamber for said operating fluid in said spindle.

14. In combination, a spindle, a series of open buckets secured to said spindle, a housing having a bearing on said spindle, said housing having a series of open buckets facing the open buckets on said spindle and containing an operating fluid and means permitting expansion of said operating fluid and the lubricant of said housing bearing.

In testimony whereof I have signed my name to this specification.

WARNER T. TABB.